US012623683B2

(12) United States Patent
O'Donnell

(10) Patent No.: US 12,623,683 B2
(45) Date of Patent: May 12, 2026

(54) METHODS AND SYSTEMS FOR MEASURING SENSOR VISIBILITY

(71) Applicant: Motional AD LLC, Boston, MA (US)

(72) Inventor: Timothy O'Donnell, West Newton, MA (US)

(73) Assignee: Motional AD LLC, Boston, MA (US)

( * ) Notice: Subject to any disclaimer, the term of this patent is extended or adjusted under 35 U.S.C. 154(b) by 105 days.

(21) Appl. No.: 18/160,024

(22) Filed: Jan. 26, 2023

(65) Prior Publication Data

US 2023/0242147 A1     Aug. 3, 2023

Related U.S. Application Data

(60) Provisional application No. 63/304,715, filed on Jan. 31, 2022.

(51) Int. Cl.
| | |
|---|---|
| *B60W 60/00* | (2020.01) |
| *G01S 7/40* | (2006.01) |
| *G01S 13/86* | (2006.01) |
| *G01S 13/931* | (2020.01) |
| *H04N 17/00* | (2006.01) |

(52) U.S. Cl.
CPC ............ *B60W 60/001* (2020.02); *G01S 7/40* (2013.01); *G01S 7/4039* (2021.05); *G01S 13/86* (2013.01); *G01S 13/931* (2013.01); *H04N 17/002* (2013.01); *B60W 2420/403* (2013.01); *B60W 2420/408* (2024.01); *B60W 2520/06* (2013.01); *B60W 2520/10* (2013.01);
(Continued)

(58) Field of Classification Search
CPC .......... B60W 60/001; B60W 2556/40; B60W 2420/408; B60W 2420/403; B60W 2520/06; B60W 2520/10; B60W 2520/105; G01S 7/4039; G01S 7/40; G01S 13/86; G01S 13/931; G01S 2013/9323; H04N 17/002
See application file for complete search history.

(56) References Cited

U.S. PATENT DOCUMENTS

| | | | | |
|---|---|---|---|---|
| 2019/0072646 | A1* | 3/2019 | Zeleny | .................. G01S 7/4004 |
| 2019/0385025 | A1* | 12/2019 | McMichael | ........... G06V 10/82 |

(Continued)

FOREIGN PATENT DOCUMENTS

| | | | | | |
|---|---|---|---|---|---|
| CN | 111226135 | A | * | 6/2020 | ........... G01S 17/931 |
| DE | 10 2018 220 114 | A1 | | 5/2020 | |
| EP | 3674161 | A1 | | 7/2020 | |

OTHER PUBLICATIONS

English translation of CN-111226135-A (Year: 2020).*

(Continued)

*Primary Examiner* — Navid Z. Mehdizadeh
*Assistant Examiner* — Matthew Ho
(74) *Attorney, Agent, or Firm* — Knobbe, Martens, Olson & Bear, LLP

(57) ABSTRACT

Provided are methods for methods and systems for measuring sensor visibility, which can include obtaining sensor data associated with an autonomous vehicle and determining a blockage parameter indicative of a blockage of a sensor based on a comparison of the sensor data with secondary data. Some methods described also include controlling an operation of an autonomous vehicle based on the blockage parameter. Systems and computer program products are also provided.

18 Claims, 8 Drawing Sheets

(52) U.S. Cl.
CPC ... *B60W 2520/105* (2013.01); *B60W 2556/40*
*(2020.02); G01S 2013/9323* (2020.01)

(56) References Cited

U.S. PATENT DOCUMENTS

| | | | | | |
|---|---|---|---|---|---|
| 2021/0065473 | A1 | | 3/2021 | Diehl et al. | |
| 2021/0178907 | A1 | * | 6/2021 | Murphy | B60L 7/02 |
| 2021/0394774 | A1 | * | 12/2021 | Zhang | B60W 60/0025 |
| 2021/0403012 | A1 | | 12/2021 | Keller et al. | |
| 2022/0135043 | A1 | * | 5/2022 | Stenneth | B60W 40/02 |
| | | | | | 701/36 |
| 2024/0361771 | A1 | * | 10/2024 | Silver | B60W 30/18172 |

OTHER PUBLICATIONS

International Search Report and Written Opinion received for PCT Patent Application No. PCT/US2023/061360, mailed on Jul. 6, 2023.

International Preliminary Report on Patentability received for PCT Patent Application No. PCT/US2023/061360, mailed on Aug. 15, 2024.

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

* cited by examiner

700

702 Obtain first sensor data

704 Obtain environment data

706 Determine a blockage parameter

708 Control an operation

METHODS AND SYSTEMS FOR MEASURING SENSOR VISIBILITY

BACKGROUND

Autonomous vehicles (AVs) include various types of sensors including lidar, radar, cameras, infrared, microphones, and other sensors. However, autonomous vehicles can have limited operational domains due to sensor visibility limitations, such as in inclement weather. Many autonomous vehicle sensors are affected by precipitation and other weather factors. Rain, snow, sleet, fog, dust, mist, hail, smoke, and other obscurants can cause reduced sensor visibility, reduced sensor range, reduced sensitivity and also create false positives.

Autonomous vehicle fleet operators weigh the capability of the vehicles against the needs of the likelihood of adverse weather conditions. Fleet operators currently do not have a method of real time measurement of sensor visibility performance in actual weather conditions. They currently are only able to rely on weather reports from traditional weather stations, the government, and local media. There is no formal standard for measuring autonomous vehicle sensor visibility. Further, it can be difficult to determine when the sensors have degraded performance due to weather, lens cleanliness, or sensor damage.

DETAILED DESCRIPTION

Figure 1:
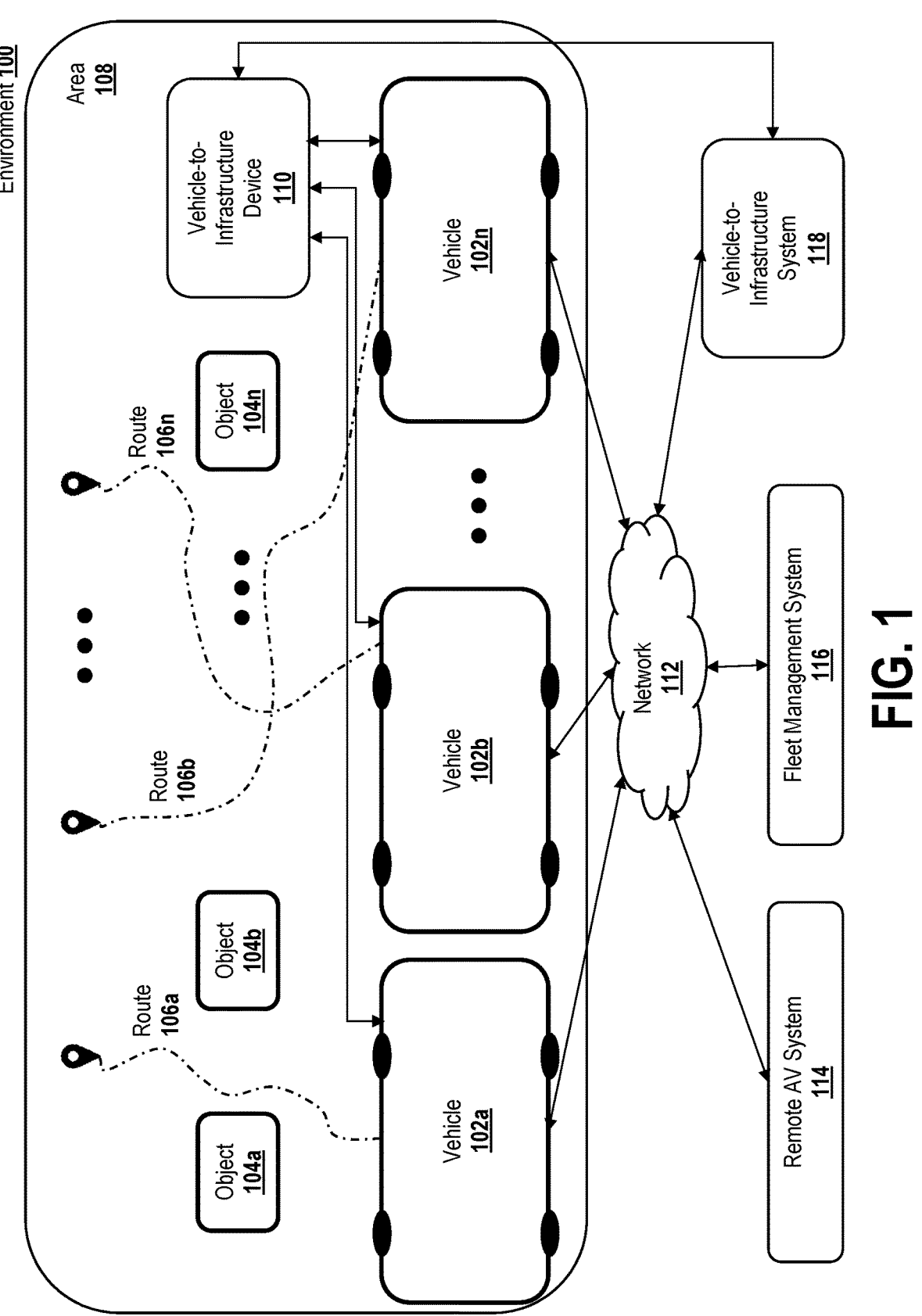
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This can refer to a direct or indirect connection that is wired and/or wireless in nature. Additionally, two units can be in communication with each other even though the information transmitted can be modified, processed, relayed, and/or routed between the first and second unit. For example, a first unit can be in communication with a second unit even though the first unit passively receives information and does not actively transmit information to the second unit. As another example, a first unit can be in communication with a second unit if at least one intermediary unit (e.g., a third unit located between the first unit and the second unit) processes information received from the first unit and transmits the processed information to the second unit. In some embodiments, a message can refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

"At least one," and "one or more" includes a function being performed by one element, a function being performed by more than one element, e.g., in a distributed fashion, several functions being performed by one element, several functions being performed by several elements, or any combination of the above."

Some embodiments of the present disclosure are described herein in connection with a threshold. As described herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a method for obtaining sensor data and determining whether there is a blockage of one or more sensors.

By virtue of the implementation of systems, methods, and computer program products described herein, techniques for methods and systems for measuring sensor visibility can provide for improved safety of a specific autonomous vehicle, or a fleet of autonomous vehicles. For example, sensor visibility and blockage detection can be analyzed to determine whether there is an adverse condition, such as an adverse weather condition, that can affect one or more autonomous vehicles in a fleet. In this example, the adverse weather condition may not yet have been registered by another source (e.g., a weather service such as the National Weather Service in the United States and/or another autonomous vehicle). The determination made can allow for automatic safety changes to the autonomous vehicles without the need for a remote operator intervention. Such safety changes can include, for example, route changes to avoid the area where the adverse condition is detected. Further advantages can include improving accuracy of sensors, such as by avoiding false positives.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 can include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
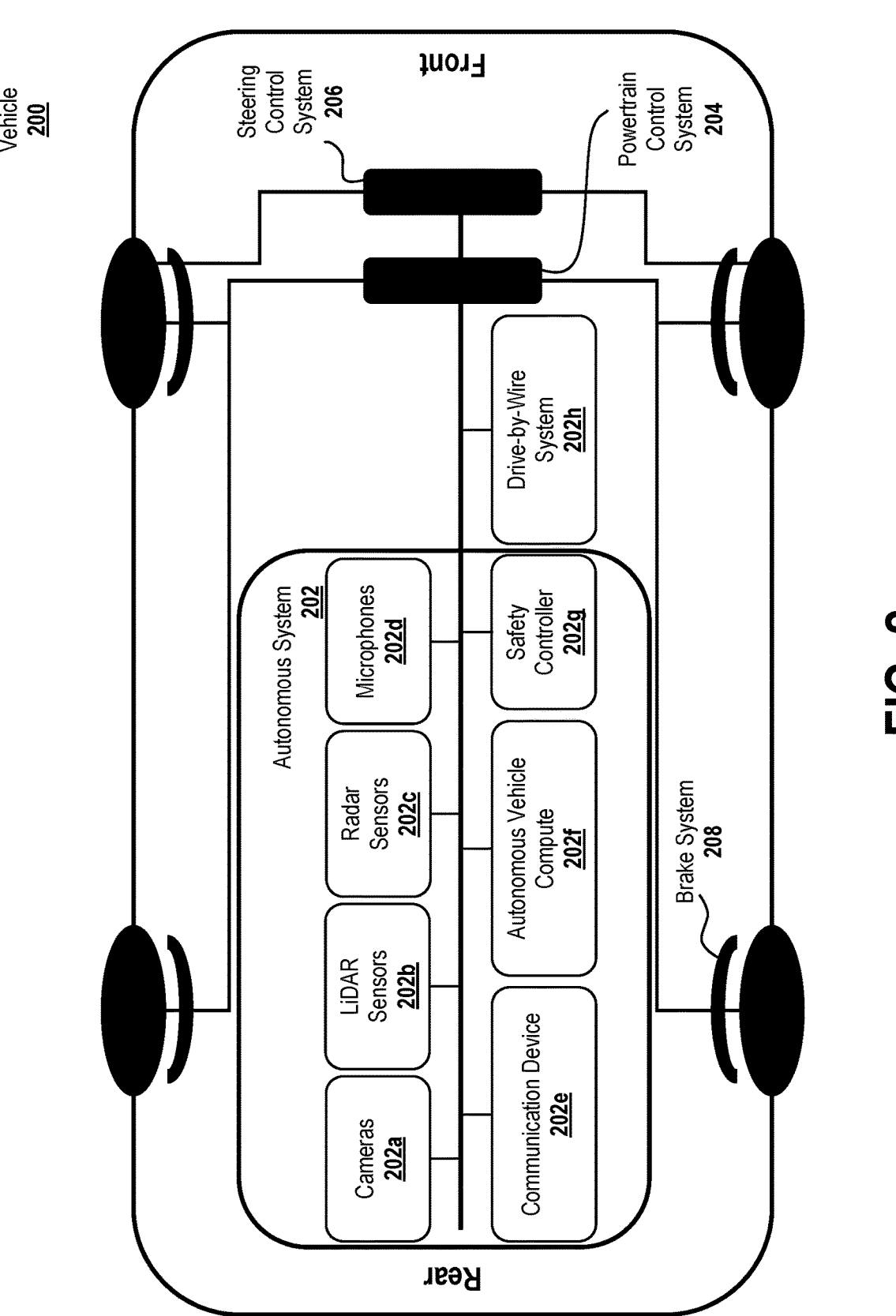
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 200 has autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference can be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, and safety controller 202*g*.

Figure 3:
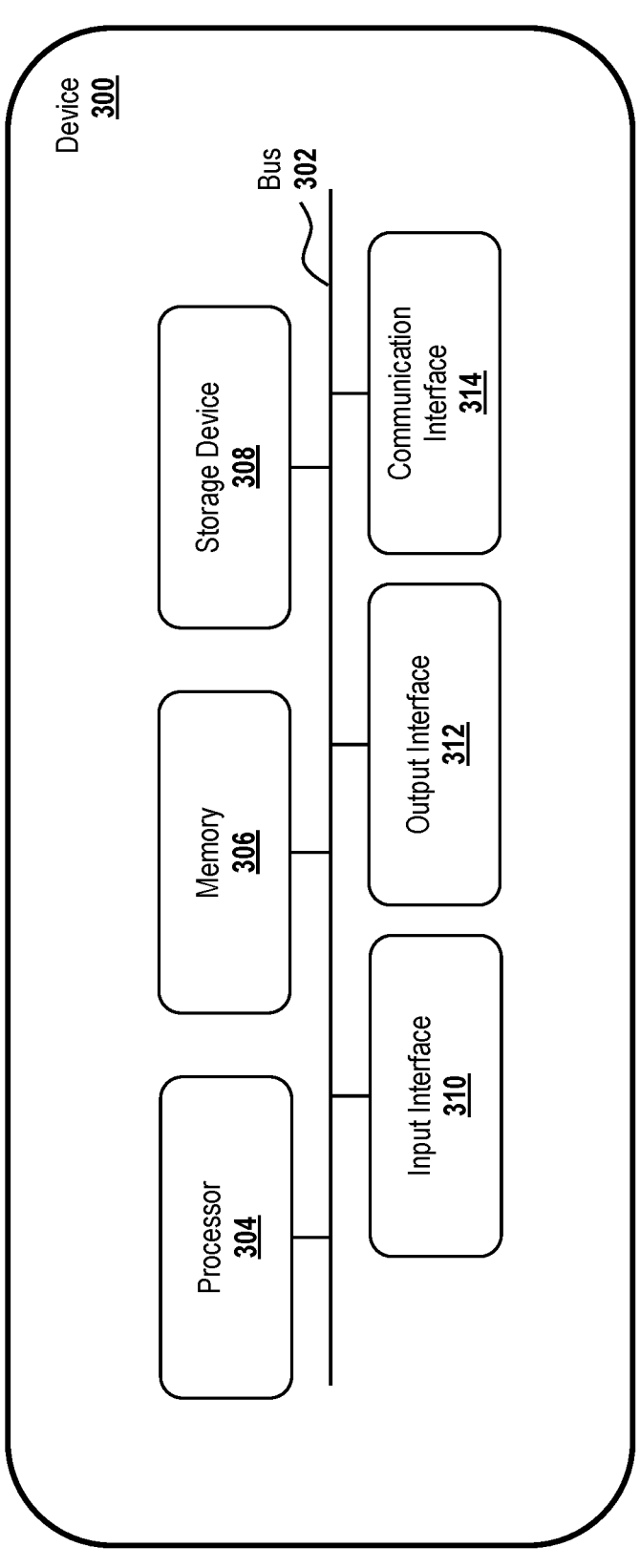
FIG. 3 is a diagram of components of one or more devices and/or one or more systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data can specify at least one parameter (e.g., image characteristics such as exposure, brightness, etc., an image timestamp, and/or the like) corresponding to the image. In such an example, the image can be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a*.

In an embodiment, camera 202*a* includes at least one camera configured to capture one or more images associated with one or more traffic lights, street signs and/or other physical objects that provide visual navigation information. In some embodiments, camera 202*a* generates traffic light data associated with one or more images. In some examples, camera 202*a* generates TLD data associated with one or more images that include a format (e.g., RAW, JPEG, PNG, and/or the like). In some embodiments, camera 202*a* that generates TLD data differs from other systems described herein incorporating cameras in that camera 202*a* can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum. In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* include at least one device configured to be in communication with cameras 202*a*, LiDAR sensors 202*b*, radar sensors 202*c*, microphones 202*d*, autonomous vehicle compute 202*f*, safety controller 202*g*, and/or DBW system 202*h*. For example, communication device 202*e* can include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

Figure 7:
FIG. 7 is a flowchart of a process for methods and systems for measuring sensor visibility.
Figure 7:
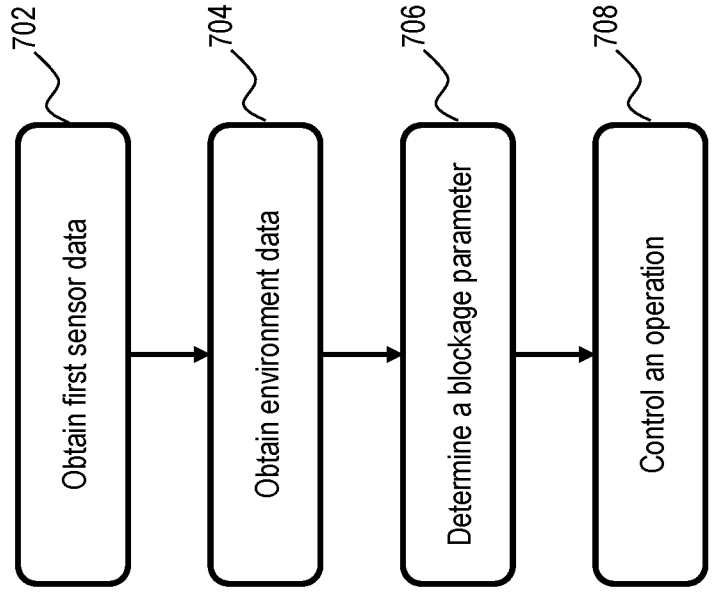

In some embodiments, device 300 is configured to execute software instructions of one or more steps of the disclosed method, as illustrated in FIG. 7.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
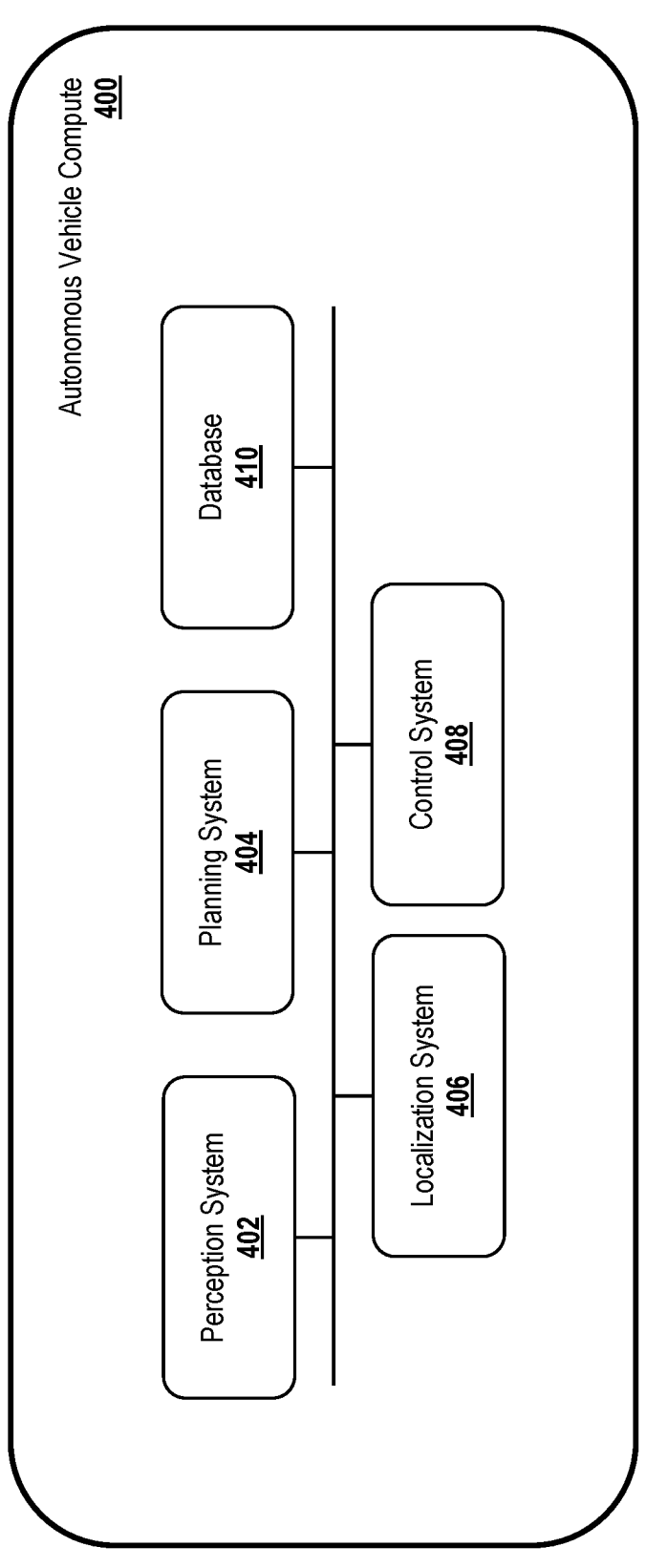
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
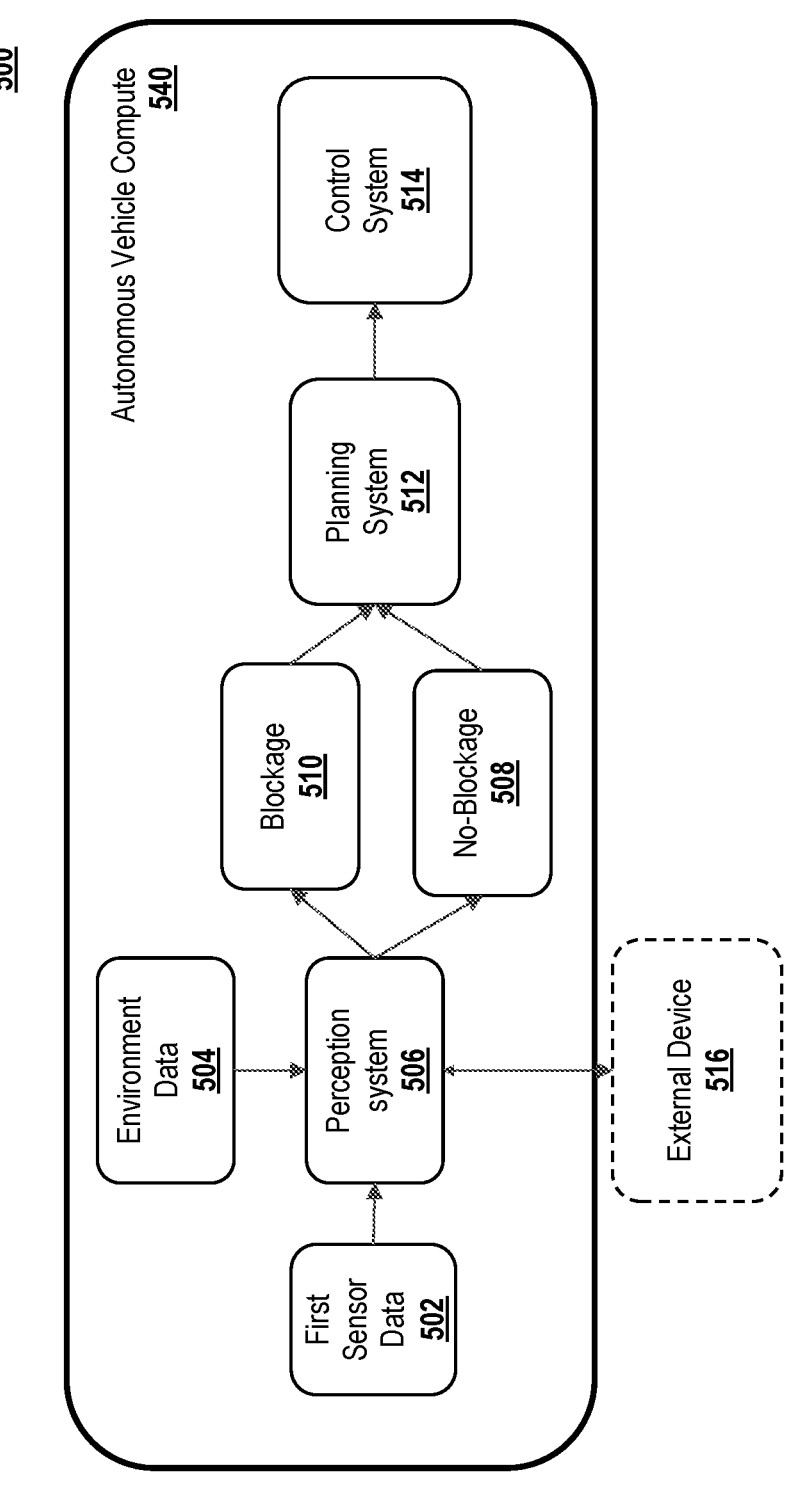
FIG. 5 is a diagram of an implementation of a process for methods and systems for measuring sensor visibility.

Referring now to FIG. 5, illustrated is a diagram of an implementation and/or system 500 of a process for methods and systems for measuring sensor visibility. In some embodiments, implementation 500 includes system, such as an AV (e.g., illustrated in FIGS. 2, 3 and 4), an AV system, a remote AV system, a fleet management system, a V2I system. In some embodiments, implementation 500 includes an AV compute 540, and a vehicle (similar to vehicle 200 of FIG. 2, such as an autonomous vehicle). The implementation 500, such as the system, can be for operating an autonomous vehicle. The implementation 500, such as the system, may not be for operating an autonomous vehicle.

The present disclosure relates to systems, methods, and computer program products that provide for onboard sensor visibility and blockage detection. Further, disclosed systems, methods, and computer program products can provide subsequent analysis of visibility and/or blockage detection for appropriately determining whether an action needs to be taken by an autonomous vehicle. Many sensors, and subsequent sensor data, can be affected by precipitation and/or other weather factors. For example, rain, snow, sleet, fog, dust, mist, hail, smoke, and other obscurants can cause reduced sensor visibility, reduced sensor range, and/or reduced sensitivity while also potentially creating false positives. Autonomous vehicle fleet operators can weigh the capability of the vehicles against the likelihood of adverse weather conditions. The present disclosure allows fleet operators to obtain real time measurement of sensor visibility performance in actual weather conditions. The disclosure provides systems, methods, and computer program products that allow rectifying the deficiencies of techniques that rely on weather reports from traditional weather stations, the government, and/or local media.

Disclosed herein is a system, such as system 500 of FIG. 5. In one or more example systems, the system 500 can include at least one processor. In one or more example systems, the system 500 can include at least one memory storing instructions thereon that, when executed by the at least one processor, cause the at least one processor to obtain first sensor data 502 from a first sensor associated with an autonomous vehicle. The first sensor data 502 can be indicative of an environment in which the autonomous vehicle is operating. In one or more example systems, the system 500 can obtain environment data 504 indicative of the environment. In one or more example systems, the system 500 can determine, based on a comparison of the first sensor data 502 and the environment data 504, a blockage parameter indicative of a blockage of the first sensor. In one or more example systems, the system 500 can control, based on the blockage parameter, an operation of the autonomous vehicle.

The system 500 can be used to determine, such as measure and/or analyze, sensor visibility. Sensor visibility can be seen a performance parameter indicative of a sensor range, for example, in operational conditions, such as a distance or a range for sensing an object in the environment. The terms "sensor visibility" and "sensor range" can be used interchangeably in one or more examples. For example, the system 500 can be used to determine whether a sensor is broken. The system 500 can be used to determine whether a sensor is blocked.

Some of the advantages of the disclosed systems, methods, and computer program products include improving safety of a specific autonomous vehicle, or a fleet of autonomous vehicles. For example, sensor visibility and blockage detection can be analyzed to determine whether there is an adverse condition, such as an adverse weather condition, that can affect one or more autonomous vehicles in a fleet. The determination made can allow for automatic safety changes to the autonomous vehicles without the need for a remote operator intervention. Further advantages can include improving accuracy of sensors, such as by avoiding false positives.

The first sensor data 502 can be obtained from one or more sensors, such as the first sensor, such as a first onboard sensor. The first sensor can be associated with the autonomous vehicle. An autonomous vehicle can include one or more sensors that can be configured to monitor an environment where the autonomous vehicle operates, such as through first sensor data 502. For example, the monitoring can provide first sensor data 502 indicative of what is happening in the environment around the autonomous vehicle, such as for determining trajectories of the autonomous vehicle. Sensors can include one or more of the sensors illustrated in FIG. 2.

The first sensor data 502 can be one or more of: radar sensor data, non-radar sensor data, camera sensor data, image sensor data, audio sensor, and LIDAR sensor data. The particular type of sensor data is not limiting.

The first sensor can be one or more of: a radar sensor, a non-radar sensor, a camera sensor, a microphone, an infrared sensor, an image sensor, and a LIDAR sensor. In one or more example systems, the first sensor can be selected from the group consisting of a radar sensor, a camera sensor, and a LIDAR sensor. The first sensor can include a first stored maximum distance parameter indicative of a maximum distance that the first sensor should be able to detect to. The first stored maximum distance parameter can be set at a factory, or during installation.

The first sensor data 502 can be indicative of an environment around an autonomous vehicle. For example, the first sensor data 502 can be indicative of an object, and/or a plurality of objects, in the environment around an autonomous vehicle.

For example, the first sensor data 502 can be indicative of a stationary object in the environment. A stationary object can include, for example, infrastructure such as buildings, light poles, signage, and/or natural environmental objects such as trees. Additionally, or alternatively, a stationary object can include a calibration target positioned in relation to the sensor.

The first sensor data 502 can be indicative of a transitory object. A transitory object can be, for example, a moving vehicle, a moving pedestrian, and/or another object in motion.

The object can be a permanent object. The object can be a non-permanent object. The object can be a moveable object. The object can be one or more of: infrastructure, a vehicle, a building, a landmark, permanent equipment, a lamp, a streetlight, and a tree. The particular type of object is not limiting.

The first sensor data 502 can include a first maximum distance parameter indicative of a maximum distance that the first sensor can obtain data from. The first maximum distance parameter can be variable, and can change depending on conditions of the first sensor and/or the autonomous vehicle. The first maximum distance parameter of the first sensor, when operating properly, can be the same as the first stored maximum distance parameter. The first maximum distance parameter of the first sensor, when not operating properly, can be different from the first stored maximum distance parameter. The first maximum distance parameter of the first sensor, when operating properly, can be in the range of the first stored maximum distance parameter (such as +/−10%). The first maximum distance parameter of the first sensor, when not operating properly, can be outside the range of the first stored maximum distance parameter.

For example, a properly working first sensor can obtain first sensor data 502 from a distance of 120 meters. The first maximum distance parameter can be indicative of 120 meters, which can be the same as the first stored maximum distance parameter. If the autonomous vehicle is experiencing rain, the first sensor data 502 can include a first maximum distance parameter of 80 meters, which can be less than the first stored maximum distance parameter. If the first sensor is broken, such as non-functioning, the first sensor data 502 can include a first maximum distance parameter of 0 meters.

The environment data 504 can be obtained from one or more sensors, such as a second sensor. The environment data 504 can be obtained from one or more sensors different from the one or more sensors providing the first sensor data 502. The first sensor can be different from the second sensor. The environment data can be considered as second sensor data.

The environment data 504 can be one or more of: radar sensor data, non-radar sensor data, camera sensor data, image sensor data, audio sensor data, LIDAR sensor data. The particular type of sensor data is not limiting. The environment data 504 can be real-time data.

The second sensor can be one or more of: a radar sensor, a non-radar sensor, a camera sensor, an image sensor, and a LIDAR sensor. The second sensor can include a second stored maximum distance parameter indicative of a maximum distance that the second sensor should be able to detect to. The second stored maximum distance parameter can be set at a factory, or during installation.

The environment data 504 can be indicative of an environment around an autonomous vehicle. For example, the environment data 504 can be indicative of an object, and/or a plurality of objects, in the environment around an autonomous vehicle.

For example, the environment data 504 can be indicative of a stationary object in the environment. A stationary object can include, for example, infrastructure such as buildings, light poles, signage, and/or natural environmental objects such as trees.

The environment data 504 can be indicative of a transitory object. A transitory object can be, for example, a moving vehicle, a moving pedestrian, and/or another object in motion.

The environment data 504 can include an environment maximum distance parameter indicative of a maximum distance that the second sensor can obtain data from. The environment maximum distance parameter can be variable, and can change depending on conditions of the second sensor and/or the autonomous vehicle (such as the conditions observed and/or experienced by the second sensor, such as the conditions taking place in the surroundings of the second sensor and/or the autonomous vehicle). The environment maximum distance parameter of the second sensor, when operating properly, can be the same as the second stored maximum distance parameter. The environment maximum distance parameter of the second sensor, when not operating properly, can be different from the second stored maximum distance parameter. The environment maximum distance parameter of the second sensor, when operating properly, can be the range of the second stored maximum distance parameter (such as +/−10%). The environment maximum distance parameter of the second sensor, when not operating properly, can be outside the range of the second stored maximum distance parameter.

The environment data 504 can be stored data, such as in a database and/or a memory. The environment data 504 can be obtained from storage, such as database and/or a memory. The environment data 504 can be obtained from a database. For example, the environment data 504 can be stored in the memory of system 500. The environment data 504 can be obtained by the system 500. For example, the environment data 504 can be stored on a server, such as a cloud server. The environment data 504 may not be real-time data.

Environment data 504 from a database can be indicative of an object, such as an object that the is in the environment the autonomous vehicle is travelling in. For example, the environment data 504 can be indicative of stationary object. This can include, for example, infrastructure such as buildings, light poles, signage, and/or natural environmental objects such as trees.

Objects in the environment can be stored in the database, and the environment data 504 can be indicative of said objects. For example, the database can include known stationary objects in the environment. The database can be updated, such as modified, as more stationary objects are known, such as built, or when stationary objects are removed. The environment data 504 can change based on the changes to the database. For example, the environment data 504 can be updated based on the first sensor data 502. This can reflect new stationary objects in the environment.

The system 500 can be configured to compare the first sensor data 502 with the environment data 504. For example, the system 500 can include a perception system 506. For example, the perception system 506 can compare the first sensor data 502 with the environment data 504. For example, a comparison can occur by determining whether the first sensor data 502 meets a criterion. For example, the perception system 506 can determine, based on the comparison, a difference between the first sensor data and the environment data. For example, the perception system 506 can determine whether the first sensor data meets the criterion by determining whether the difference is above a threshold. For example, the system 500 (e.g., perception system) can determine that the blockage parameter can be indicative of no blockage if the first sensor data 502 meets the criterion by having a difference below or equal to the threshold. For example, the system 500 (e.g., perception system) can determine that the blockage parameter can be indicative of a blockage if the first sensor data 502 does not meet the criterion by having a difference above the threshold.

For example, the system 500 (e.g., perception system) can determine that the blockage parameter can be indicative of no blockage if the first sensor data 502 and the environment data 504 are both indicative of the same object. However, the system 500 can determine that the blockage parameter can be indicative of a blockage if the first sensor data 502 is not indicative of an object indicated in the environment data 504.

A blockage parameter can be seen as a parameter indicative of a blockage of the first sensor. As used herein, blockage can be one or more of: blockage, occlusion, obscurance, and breakage. The blockage parameter can be indicative of a full blockage of the first sensor. The blockage parameter can be indicative of a partial blockage of the first sensor. The blockage parameter can be determined in the perception system 506. The blockage parameter can be determined by a comparison of the sensor data 502 with the environment data 504. The blockage parameter can be determined in an additional system and/or module.

For example, the first sensor data 502 can include a plurality of first sensor data points, such as a cloud of first sensor data point. For example, a first sensor data point is a LIDAR data point. For example, the environment data 504 can include a plurality of environment data points, such as a cloud of environment data. The environment data point may be a LIDAR data point.

For example, the perception system 506 can compare the first sensor data point with a corresponding environment data point. For example, the perception system 506 can determine, based on the comparison, if the first sensor data point is different from the corresponding environment data point. For example, when the number of first sensor data points differing from corresponding environment data points is above a threshold, the system determines that the first sensor data does not meet the criterion. For example, the system 500 (e.g., perception system) can determine that the blockage parameter can be indicative of a blockage if the first sensor data 502 does not meet the criterion by having the number of first sensor data points differing from corresponding environment data points above the threshold. For example, the system 500 (e.g., perception system) can determine that the blockage parameter can be indicative of no blockage when the first sensor data 502 meets the criterion by having the number of first sensor data points differing from corresponding environment data points below or equal to the threshold.

The threshold may be seen as an object threshold which can be an amount, such as a number, of the plurality of first sensor data points being indicative of the object. For example, the object threshold can be 50%, 75%, etc. of the plurality of first sensor data points being indicative of the object.

For example, the system 500 (e.g., perception system) can determine that the blockage parameter can be indicative of no blockage if the first sensor data 502 and the environment data 504 both satisfy the object threshold. However, the system 500 can determine that the blockage parameter can be indicative of a blockage if the first sensor data 502 does not satisfy the object threshold for an object indicated in the environment data 504.

For example, the blockage parameter can be a parameter that indicates that the sensor is not working. The blockage parameter can be a parameter that indicates that the sensor is not working properly. The blockage parameter can be a parameter that indicates that the sensor is working at a limited capacity.

For example, the blockage parameter can be a parameter that indicates if there is a blockage of the first sensor or not, such as in form of a flag.

The blockage parameter can indicate a condition that reduces range and/or visibility of the first sensor, such as the first maximum range. A condition can be an internal condition of a sensor (e.g., malfunction), and/or an external condition observed by the sensor (e.g., weather condition(s)). The blockage parameter can indicate a blockage 510, such as an obscurance, and/or a malfunction. The blockage parameter can be indicative of a full blockage, partial blockage, and/or reduced visibility. The blockage parameter can indicate no blockage 508. For example, if the first maximum distance parameter is less than the first stored maximum distance parameter, the system 500 (e.g., perception system 506) can determine the blockage parameter as indicating a blockage 510, which can show that the first sensor can be blocked, or otherwise occluded, and/or limited in range.

A sensor can be blocked for a number of reasons. For example, weather conditions can affect and/or limit the range and/or visibility of the sensor, thus the blockage parameter can be indicative of a blockage. The sensor can be covered by a substance, such as debris, direct, or snow, which can affect and/or limit range and/or visibility of the sensor, thus the blockage parameter can be indicative of a blockage. A sensor can be damaged, such as having a scratched lens, which can affect and/or limit range and/or visibility of the sensor, thus the blockage parameter can be indicative of a blockage.

Blockage of the first sensor can be one or more of: the first sensor being broken, the first sensor being off, and the first sensor being limited. The first sensor can be limited by, for example, inclement weather such as rain, snow, sleet, and fog.

In one or more example systems, a perception system 506, such as perception system 402 of FIG. 4, can obtain the first sensor data 502 and the environment data 504. The perception system 506 can determine the blockage parameter based on the environment data 504 and the first sensor data 502 and optionally can provide the blockage parameter to a planning system 512 of the system 500. In one or more example systems, a planning system 512, such as a planning system 404 of FIG. 4, can determine, based on the blockage parameter, a planning of operation of the autonomous vehicle. If the blockage parameter is indicative of no-blockage, the planning system 512 may not need to adjust planning of operation of the autonomous vehicle. If the blockage parameter is indicative of blockage, the planning system 512 can adjust planning of an operation of the autonomous vehicle. The systems 506, 512, 514, discussed herein can be controlled by, and/or a component of, the autonomous vehicle compute 540.

In one or more example systems, the autonomous vehicle compute 540, such as from the perception system 506, can provide control data to an external device 516. The control data can be indicative of the blockage parameter. The control data can include the blockage parameter. The control data can be used for updating the actions of a fleet of autonomous vehicles. For example, the blockage parameter can be indicative of reduced ranges of sensors on the autonomous vehicle, such as due to adverse weather conditions. The external device 516 can be other autonomous vehicles. The external device 516 can be used by a fleet management system.

A control system 514, such as a control system 408 discussed with respect to FIG. 4, can control operation of the autonomous vehicle. For example, the control system 514 can determine a safe operation of the autonomous vehicle. The control system 514 can include a request for maintenance of an autonomous vehicle.

As an example, if a blockage parameter is indicative of a blockage, the system 500, such as control system 514, can be configured to control operation of the autonomous vehicle for safe operation, such as by slowing the vehicle down. This can be advantageous in still allowing the autonomous vehicle to continue operation, just at a slower speed to allow more time for sensor data analysis.

Further, if a blockage parameter is indicative of a blockage, the system 500, such as control system 514, can be configured to control operation of the autonomous vehicle by stopping the vehicle. For example, if the sensor blockage is so significant as to cause problems, the autonomous vehicle may not continue to operate in order to provide passenger safety.

If a blockage parameter is indicative of a blockage, the system 500, such as control system 514, can be configured to send out a maintenance request, such as a maintenance signal. The maintenance request can be indicative of a broken sensor.

In one or more example systems, to determine the blockage parameter can include to determine whether the first sensor data 502 satisfies a criterion. For example, the perception system 506 can determine, based on the comparison, a difference between the first sensor data and the environment data. For example, the perception system 506 can determine whether the first sensor data satisfies the criterion by determining whether the difference is above a threshold. For example, the system 500 (e.g., perception system) can determine that the blockage parameter can be indicative of no blockage if the first sensor data 502 satisfies the criterion by having a difference below or equal to the threshold. For example, the system 500 (e.g., perception system) can determine that the blockage parameter can be indicative of a blockage if the first sensor data 502 satisfies the criterion by having a difference above the threshold.

In one or more example systems, the criterion is based on an object indicated by the environment data, such as an object in the environment. In one or more example systems, the first sensor data satisfies the criterion when the first sensor data indicates presence of the same object. For example, the first sensor data satisfies the criterion, when the first sensor data indicates the presence of a same object indicated in the environment data. For example, the object indicated in the environment data can be a stationary object, such as an infrastructure, such as a building, such as lamp post, such as a traffic light.

For example, the criterion can be whether the first sensor data 502 is indicative of an object indicated by the environment data 504. The criterion can be whether the first sensor data 502 is indicative of a location indicated by the environment data 504.

For example, an autonomous vehicle can be at a particular location. The environment data 504 can indicate that an object, for example a building, is 100 m in front of the autonomous vehicle. If the first sensor data 502 is indicative of that object (for example the building 100 m in front of the autonomous vehicle), then the first sensor data 502 satisfies the criterion. If the first sensor data 502 is not indicative of that object (for example the building 100 m in front of the autonomous vehicle), then the first sensor data 502 does not satisfy the criterion.

As discussed, being indicative of the object can include being indicative of the same object. For example, the environment data 504 can be indicative of a building and the first sensor data 502 can be indicative of the building. For example, the first sensor data satisfies the criterion when the first sensor data 502 is indicative of the same building as indicated in the environment data 504.

Being indicative of the object can include being indicative of an object at a particular location, for example indicative of the presence of the object at the particular location. For example, the environment data 504 can be indicative of an object at 100 m, but not necessarily the type of object, and the first sensor data 502 can be indicative of an object at that location.

In one or more example systems, the criterion can be whether the first maximum distance parameter of the first sensor is equal to (or in the range of, such as +/−10%) the stored maximum distance parameter of the first sensor. For example, the system 500 determines that the first sensor data 502 can satisfy the criterion, if the first maximum distance parameter is equal to (or in the range of, such as +/−10% of) the stored maximum distance parameter. For example, the system 500 determines that the first sensor data 502 does not satisfy the criterion if the first maximum distance parameter is not equal to (or not in the range of, such as not +/−10% of) the stored maximum distance parameter.

The criterion can be based on a threshold. The criterion can be based on one or more thresholds. For example, the system 500 can be configured to obtain third sensor data from a third sensor and fourth sensor data from a fourth sensor. The third sensor data and the fourth sensor data can also be compared to the environment data 504.

The threshold can be a number of sensors providing sensor data that is indicative of the object indicated by the environment data 504. The threshold can be a number of sensors providing sensor data that is not indicative of the object in the environment indicated by the environment data 504. The threshold can be a percentage of sensors providing sensor data that is indicative of the object. The threshold can be a percentage of sensors providing sensor data that is not indicative of an object.

As an example, an autonomous vehicle can include three sensors having respective first sensor data, third sensor data, and fourth sensor data. The threshold can be at least two sensors providing sensor data being indicative of the object in the environment indicated by the environment data 504. For example, if the first sensor data, the third sensor data, and the fourth sensor data are all indicative of the object, the criterion is satisfied. For example, if only the first sensor data is indicative of the object, the criterion is not satisfied.

For example, when the system 500 determines that the first sensor data 502 indicates the presence of the object that is indicated in the environment data 504, the system 500 determines that the first sensor data satisfies the criterion. The distance from the autonomous vehicle to the position of the object can be used in the criterion. Different distance checks can be used.

In one or more example systems, the criterion can include a time threshold, such as a time parameter. The time threshold can be indicative of the amount of time that the first sensor data 502 is not indicative of the object indicated in the environment data 504. For example, the time threshold can be 1, 2, 3, 4, or 5 seconds. The time threshold can be 1, 2, 3, 4, or 5 minutes. Advantageously, using a time threshold can prevent a determination of a blockage parameter indicative of the first sensor being blocked if the blockage is merely momentary.

For example, the autonomous vehicle can be stopped in a position that blocks the first sensor from being indicative of an object known from the environment data 504, such as by another vehicle during stoppage of a traffic light. However, this situation would change once the traffic light allows traffic to begin moving after 30 seconds, whereas the first sensor would be indicative of the object. The system would not determine a blockage parameter indicative of the first sensor being blocked as the situation resolved within the time threshold.

In one or more example systems, to determine the blockage parameter can include, in response to determining that the first sensor data 502 does not satisfy the criterion, to determine the blockage parameter as indicative of the first sensor being blocked, for example illustrated as Blockage 510 in FIG. 5.

For example, the first sensor can be blocked, such as partially blocked, such as with reduced range and/or visibility. The system 500 can determine the blockage parameter as indicative of the first sensor being blocked in response to determining that the first sensor data does not satisfy the criterion. For example, the first sensor can have reduced visibility due to weather conditions.

In one or more example systems, the determination of the blockage parameter by the system 500 can include, in response to determining that the first sensor data does satisfy the criterion, to determine the blockage parameter as indicative of the first sensor not being blocked. For example, the first sensor may not be blocked, such as operating properly.

The system 500 can be configured to control an operation of an autonomous vehicle (such as via the planning system 512 and/or the control system 514). In one or more examples, the operation can include one or more of a speed, an acceleration, a maximum safe speed and a direction of the autonomous vehicle. For example, the system 500 can be configured to speed up, slow down, stop, and/or change direction of an autonomous vehicle. Further, the system 500 can control signals that can be sent by the autonomous vehicle, such as maintenance requests.

For example, when the system 500 determines that the blockage parameter indicates a blockage of the first sensor, one or more of a speed, an acceleration, and a direction of the autonomous vehicle can be modified by the system 500. When the system 500 determines that the blockage parameter indicates no blockage of the first sensor, one or more of a speed, an acceleration, and a direction of the autonomous vehicle are not modified by the system 500. Advantageously, real time sensor data can be used by the autonomous vehicle to reduce speed to safe levels automatically without the need for a remote operator intervention. The onboard sensor data (e.g., indicative of visibility and/or range) can be used by an autonomous vehicle fleet systems to capture data from multiple areas in the operation zone and to allow for partial speed reductions because of local weather in part of the operation area. This can allow part of the area to remain operational.

In one or more example systems, wherein the control of an operation of the autonomous vehicle is based on the blockage parameter and an external blockage parameter.

The external blockage parameter can be indicative of a sensor blockage of an alternative vehicle in a fleet (such as another vehicle). For example, the system 500 can be configured to receive an external blockage parameter, such as from an external device 516. The external blockage parameter can be received from other autonomous vehicles in a fleet of autonomous vehicles. The external blockage parameter can be indicative of an adverse weather. In response to receiving an external blockage parameter indicative of a blockage, the system 500 can slow down the autonomous vehicle.

For example, the external blockage parameter can be obtained from an external device 516 which is not associated with the autonomous vehicle. The external device can be, for example, from another autonomous vehicle, such as from an autonomous vehicle fleet system, and/or from a V2I system.

In one or more example systems, the at least one memory storing instructions thereon can, when executed by the at least one processor, cause the at least one processor to control an operation of a vehicle in a fleet of autonomous vehicles.

For example, the system 500 can be configured to a command, such as a signal, to a fleet system for autonomous vehicles. The system 500 can transmit a command to an external device 516. The external device 516 can be one or more other autonomous vehicles in a fleet of autonomous vehicles. The external device 516 can be a device used by a fleet operator.

In one or more example systems, the environment data 504 can be obtained from a three-dimensional map data.

The environment data 504 can be obtained from map data. Map data can be seen as data indicative of a map, such as a geographic map. The environment data 504 can be indicative of map data. The environment data 504 can include map data. The map data can be obtained from a navigation system. The environment data 504 and/or the map data can be stored data, such as in a database, for example the memory of system 500. The environment data 504 and/or the map data can be stored in an autonomous vehicle.

The environment data 504 can be static data, such as non-changing data. The environment data 504 can be indicative of one or more objects in the environment. The system 500 can obtain, such as retrieve, the environment data 504, such as from a memory and/or a database. The map data can include high definition (HD) map data. The map data can include one or more stationary objects. The map data can be indicative of one or more stationary objects.

In one or more example systems, the at least one memory storing instructions thereon that, when executed by the at least one processor, can cause the at least one processor to obtain, using the at least one processor, location data indicative of a location of the autonomous vehicle.

For example, the location data can be obtained from global positioning system (GPS) data. The location data can be used to determine relevant portions of the environment data 504. For example, the environment data 504 can be map data of an entire city. However, there may not be any need for environment data 504 on the entire city, and the location data can be used to determine a relevant portion of the environment data 504, for example the environment where the autonomous vehicle is currently located in. The location data can be indicative of a location of the first sensor.

In one or more example systems, the criterion can be based on the environment data 504 and the location data.

For example, the environment data 504 can be indicative of a 'ground truth' of the operational domain, such as the area where the autonomous vehicle operates, for example indicated by the location data. For example, the environment data 504 can include high accurate 3D data of all stationary objects in the area of operation. The environment data 504 and/or the location data can be used to localize the autonomous vehicle by matching stationary objects to the environment data 504 in real time. Location data can also be used to localize the autonomous vehicle to a known location in the environment data 504, such as HD map. Weather can diminish the first sensor range. The system 500 can compare the first sensor data 502 (such as real time sensor object data) to the environment data 504 (such as HD map data optionally tailored with location data) to check if the first sensor is accurately detecting stationary objects, and thereby if the first sensor data satisfies the criterion.

In certain implementations, the criterion can be based on both the environment data 504 and the location data. For example, the environment data 504 can include map data, or other static data stored in the system 500, such as in a database or a memory. The environment data 504 can include data that is outside of the range of any sensors of the autonomous vehicle, including the first sensor. Accordingly, it can be advantageous to obtain location data indicative of the location of the autonomous vehicle. The location data can be used, for example, to determine a portion of the environment data 504 that would be relevant to the autonomous vehicle, such as a portion of the environment data 504 that can also be seen by the first sensor data 502.

In one or more examples, the comparison of the first sensor data and the environment data can include a comparison of the first sensor data and a localized environment data. For example, the localized environment data can be obtained by the system 500 based on the environment data and the location data. In other words, the localized environment data can be obtained by filtering the environment data based on the location data indicative of the location of the autonomous vehicle.

The criterion can be indicative of whether the environment data 504 at a particular location indicated by the location data includes an object that is also sensed by the first sensor data 502 at that location.

For example, the environment data 504 can include information on different objects in an environment that the autonomous vehicle is located in. This can include buildings, signs, equipment or other infrastructure. For example, the first sensor data 502 should be able to be indicative of these objects, e.g., the first sensor should be able to detect (e.g., "see") these objects, which are known from the environment data 504. If the first sensor data 502 is not indicative of an object that it "should" be indicative of, the first sensor can not be working properly, or can be obscured. This can include the blockage parameter being indicative of the first sensor being blocked.

If the first sensor is working properly, the first sensor data 502 should be indicative of the same objects as the environment data 504.

In one or more examples, the system 500 determines that the first sensor data 502 satisfies the criterion in response to determining that the first sensor data 502 is indicative of an object indicated by the environment data 504 at the location indicated by the location data. For example, the system 500 can determine that the blockage parameter is indicative of the first sensor not being blocked in response to determining that the first sensor data 502 is indicative of an object indicated by the environment data 504 at the location indicated by the location data.

In one or more examples, the system determines that the first sensor data 502 does not satisfy the criterion, in response to determining that the first sensor data 502 is not indicative of an object indicated by the environment data 504 at the location indicated by the location data. For example, the system 500 can determine that the blockage parameter is indicative of the first sensor being blocked, in response to determining that the first sensor data 502 is not indicative of an object indicated by the environment data 504 at the location indicated by the location data.

In one or more example systems, the environment data 504 can be obtained from a second sensor. The environment data 504 can be considered as second sensor data. The second sensor can be a different sensor from the first sensor.

It can be envisaged that the second sensor is more robust than the first sensor in challenging weather condition(s) and can be used to compare the second sensor data to the first sensor data. For example, radar sensors are more robust to challenging weather condition(s) than camera(s) and/or LIDAR sensor(s).

In one or more example systems, the second sensor is a same type of sensor as the first sensor. For example, the first sensor and the second sensor can both be image sensors. However, the second sensor is not the first sensor.

In one or more example systems, the second sensor is a different type of sensor as the first sensor. For example, the first sensor can be an image sensor and the second sensor can be a LIDAR sensor. In one or more example systems, the first sensor is a non-radar sensor and the second sensor is a radar sensor. In one or more example systems, the first sensor is a first type of sensor and the second sensor is a second type of sensor different from the first type of sensor.

In one or more example systems, the at least one memory storing instructions thereon that, when executed by the at least one processor, cause the at least one processor to determine, based on the first sensor data 502 and the environment data 504, an overlapping field-of-vision parameter indicative of a maximum overlapping field-of-vision of the first sensor and the second sensor. An overlapping field-of-vision parameter can be seen as an overlapping field-of-view parameter indicative of a maximum overlapping field-of-view of the first sensor and the second sensor.

For example, the first sensor data 502 can come from a first sensor having a particular range of detection, such as a first field-of-vision. Similarly, the environment data 504 can be obtained from a second sensor which also has a particular range of detection, such as a second field-of-vision. As the first sensor and the second sensor can be different types, they can have different field of visions. Even if the first sensor and the second sensor are of different types, they can also have different filed of visions due to location and/or placement of the first sensor and the second sensor. In certain implementations, the first field-of-vision and the second field-of-vision can be different. In certain implementations, the first field-of-vision and the second field-of-vision can be the same.

While the first sensor and the second sensor can have different fields-of-vision, there can be overlap between the two fields-of-vision. The system 500 can be configured to determine, based on the first sensor data 502 of the first sensor and the environment data 504 of the second sensor an overlapping field-of-vision parameter. The overlapping field-of-vision parameter can be indicative of a maximum overlapping field-of-vision of the first sensor and the second sensor, e.g., the areas that can be "seen" by both the first sensor and the second sensor.

The overlapping field-of-vision can be the same as the field-of-vision of the first sensor data and/or the second sensor data. The overlapping field-of-vision can be different than the field-of-vision of the first sensor data and/or the second sensor data.

In one or more example systems, the criterion can be based on the environment data 504 and the overlapping field-of-vision parameter.

In certain implementations, the criterion can be based on both the environment data 504 and the overlapping field-of-vision parameter. The overlapping field-of-vision parameter can be used, for example, to determine an area that both the first sensor and the second sensor should detect (such as "see"), and reflect in the obtained sensor data.

The criterion can be indicative of whether the environment data 504 at a particular location indicated by the overlapping field-of-vision parameter includes an object that is also sensed by the first sensor data 502 as indicated by the overlapping field-of-vision parameter.

For example, the environment data 504 can include information on different objects in an environment that the autonomous vehicle is located in, based on what the second sensor can be indicative of. This can include buildings, signs, or other infrastructure. The first sensor data 502 should be able to be indicative of these objects, e.g., the first sensor should be able to detect (e.g., "see") these objects, which are also seen by the second sensor, indicated in the environment data 504, if these objects are located in the maximum overlapping field-of-vision as indicated by the overlapping field-of-vision parameter. If the first sensor data 502 is not indicative of an object it "should" be indicative of, the first sensor may not be working properly, or can be obscured. This can include the blockage parameter being indicative of the first sensor being blocked.

If the first sensor is working properly, the first sensor data 502 should be indicative of the same objects as the environment data 504. However, if the object is not in the maximum overlapping field-of-vision as indicated by the overlapping field-of-vision parameter, the system 500 can ignore that object as the first sensor would not be able to see it, which would not be indicative of any blockage.

In one or more examples, the system 500 can determine that the first sensor data 502 satisfies the criterion in response to determining that the first sensor data 502 is indicative of an object in the maximum overlapping field-of-vision that the environment data 504 is indicative of. For example, the system 500 can determine that the blockage parameter is indicative of the first sensor not being blocked in response to determining that the first sensor data 502 is indicative of an object in the maximum overlapping field-of-vision that the environment data 504 is indicative of.

In response to determining that the first sensor data 502 is not indicative of an object in the maximum overlapping field-of-vision that the environment data 504 is indicative of, the system 500 can determine that the first sensor data 502 does not satisfy the criterion. For example, the system 500 can determine that the blockage parameter is indicative of the first sensor being blocked in response to determining that the first sensor data 502 is not indicative of an object in the maximum overlapping field-of-vision that the environment data 504 is indicative of.

For example, an object, or a location can be a point at a distance, multiple points, and/or at multiple distances.

Figure 6A:
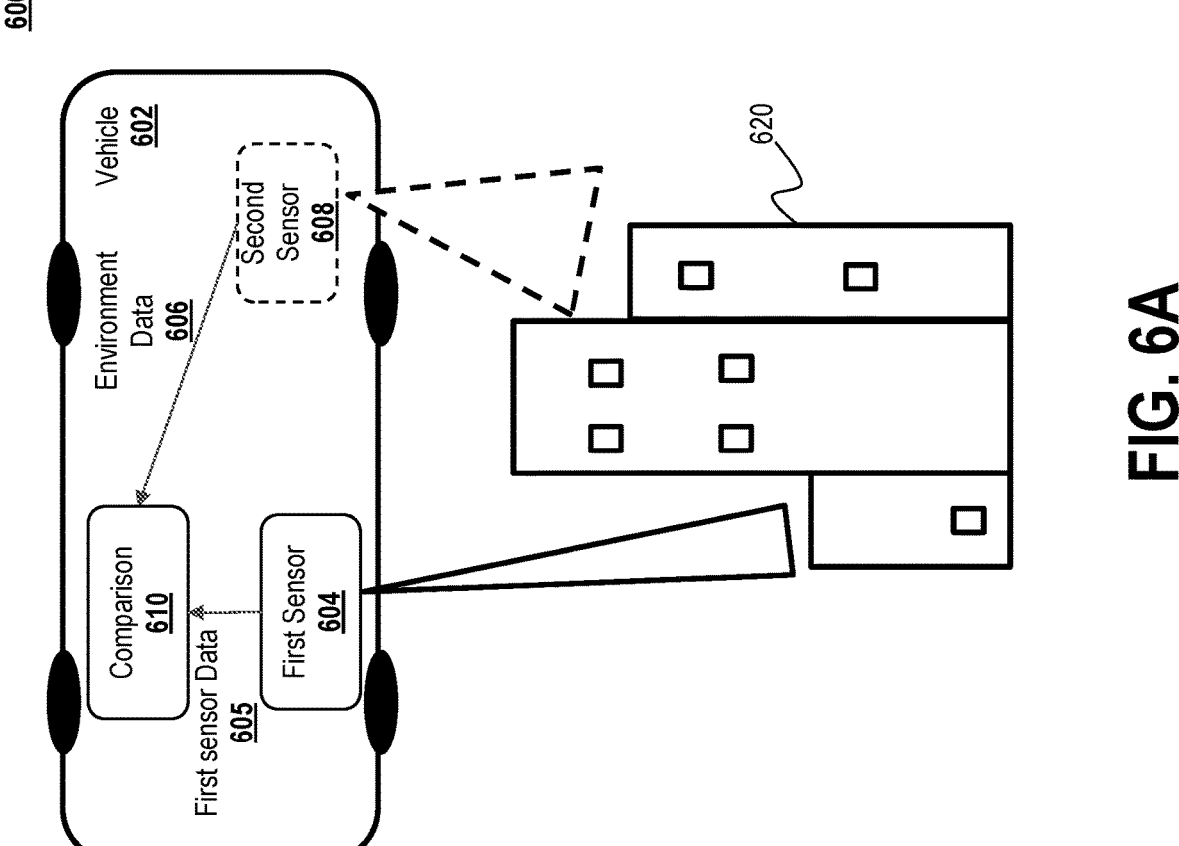
FIGS. 6A-6B are diagrams of an implementation of a process for methods and systems for measuring sensor visibility.
Figure 6B:
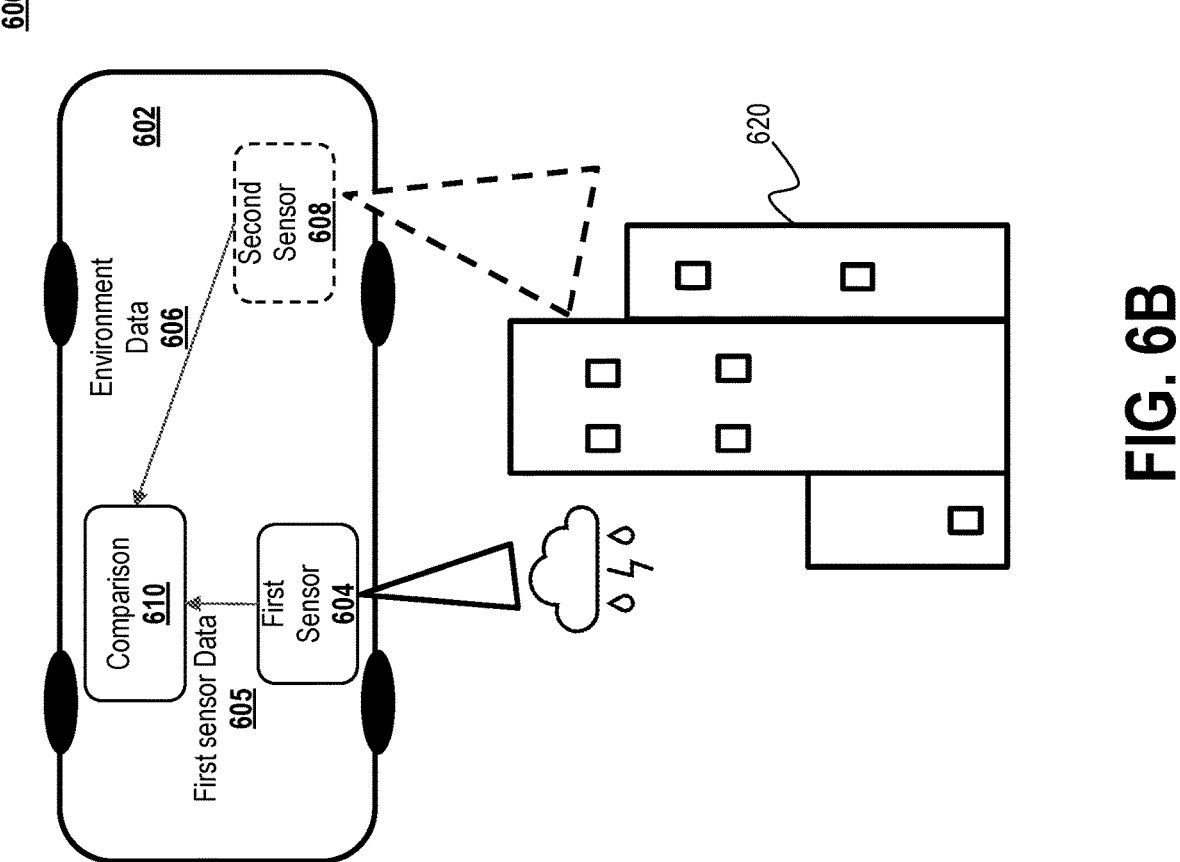

Referring now to FIGS. 6A-6B, illustrated are diagrams of an implementation 600 of a process for methods and systems for measuring sensor visibility.

As shown in FIG. 6A, an autonomous vehicle 602 can include a first sensor 604 configured to generate first sensor data 605, such as first sensor data 502 of FIG. 5. The autonomous vehicle 602 can have access to environment data 606, such as environment data 504 of FIG. 5. The environment data 606 can be stored in the autonomous vehicle 602. The environment data 606 can be (for example, partly generated) generated by a second sensor 608 of the autonomous vehicle 602.

The autonomous vehicle can compare 610 the first sensor data 605 and the environment data 606, such as by one or more systems and/or modules of the autonomous vehicle 602, such as those discussed with respect to FIGS. 1-5. Based on the comparison 610, the autonomous vehicle 600 can determine a blockage parameter which can be indicative of a blockage or indicative of no blockage.

FIG. 6A illustrates an example 600 where an autonomous vehicle 602 can determine a blockage parameter indicative of no blockage. Thus, the sensors of the autonomous vehicle 602 are working properly.

As shown, the first sensor 604 can generate first sensor data 605 indicative of an object, in this case building 620. The environment data 606 can also indicate of the building 620. For example, the building 620 can be stored in a database which is or is accessible by the environment data 606. The building 620 can be indicated and/or detected by environment data 606 generated by a second sensor 608.

The autonomous vehicle 602 can compare the environment data 606 and the first sensor data generated by the first sensor 604. Based on a criterion, the blockage parameter can be determined. In the situation shown in FIG. 6A, the criterion can be satisfied if the first sensor data 605 generated by the first sensor 604 is indicative of an object that is indicated in the environment data 606. As both the first sensor data 605 generated by the first sensor 604 and the environment data 606 both indicate presence of building 620, the criterion is satisfied by the first sensor data 605, and thereby the vehicle 602 can determine the blockage parameter as indicative of no blockage. Thus, the autonomous vehicle 602 can be controlled to operate as normal.

A number of different sensors can be used, which can have different operational ranges. For example, the building 620 can be in a known position of 100 meters away from the vehicle 602. The first sensor 604 can be a LIDAR sensor with a range of 150 meters. The first sensor 604 can provide first sensor data indicative of the building 620. Thus, the first sensor 604 can "pass", such as satisfying a criterion, and is operating properly. Similarly, the first sensor 604 can be a radar sensor, camera, or other sensor. In certain implementations, the vehicle 602 can include a third sensor, fourth sensor, etc., each having data which can be used to determine whether a blockage parameter is indicative of a blockage.

Moving to FIG. 6B, the autonomous vehicle 602 can be the same vehicle as that discussed with respect to FIG. 6A. However, unlike FIG. 6A, the autonomous vehicle 602 can determine a blockage parameter indicative of a blockage.

As shown, the environment data 606 can be indicative of building 620 in the environment. The autonomous vehicle 602 is located in weather conditions which can cause reduced sensing distances of the first sensor 604 such as a thunderstorm. As shown, the thunderstorm prevents the first sensor 604 from generating first sensor data 605 indicative of a building 620. For example, rain from the thunderstorm can limit the range of the first sensor 604.

As during the comparison 610 the first sensor data 605 generated by the first sensor 604 is not indicative of the building that is indicated in the environment data 606, the criterion is not satisfied by the first sensor data 605. The blockage parameter can be determined as indicative of a blockage. Thus, the autonomous vehicle 602 can be controlled, such as slowing the operating speeds of the autonomous vehicle 602 due to reduced sensor capacity.

The first sensor 604 can be a LIDAR sensor with a range of 150 meters. The first sensor 604 may not provide first sensor data 605 indicative of the building 620. Thus, the first sensor 604 can "fail", such as not satisfying a criterion, and is blocked in some manner. Similarly, the first sensor 604 can be a radar sensor, camera, or other sensor. In certain implementations, the vehicle 602 can include a third sensor, fourth sensor, etc., each having data which can be used to determine whether a blockage parameter is indicative of a blockage.

In some implementations, certain types of sensor can work better in certain environmental situations, it and can be advantageous to know which types of sensors are working properly. For example, the vehicle 602 can include four LIDAR sensors. Three of the LIDAR sensors can generate data indicative of the building 620, and a blockage parameter can be determined indicative of no blockage of these sensors. One of the LIDAR sensors can generate data not indicative of the building 620, and a blockage parameter can be determined indicative of a blockage of this sensor. The same type of sensors for multiple sensors can be used to check whether a particular sensor is not operating, or whether the vehicle 602 as a whole is under some condition affecting all sensors.

Referring now to FIG. 7, illustrated is a flowchart of a method or process 700 for methods and systems for measuring sensor visibility, such as for operating and/or controlling an AV. The method can be performed by a system disclosed herein, such as an AV compute 400, device 300 and a vehicle 102, 200, of FIGS. 1, 2, 3, 4 and the system of FIG. 5 and implementations of FIGS. 6A-6B.

Disclosed herein is a method 700. In one or more example methods, the method 700 can include obtaining, at step 702, using at least one processor, first sensor data from a first sensor associated with an autonomous vehicle, wherein the first sensor data is indicative of an environment in which the autonomous vehicle is operating. In one or more example methods, the method 700 can include obtaining, at step 704, using the at least one processor, environment data indicative of the environment. In one or more example methods, the method 700 can include determining at step 706, using the at least one processor, based on a comparison of the first sensor data and the environment data, a blockage parameter indicative of a blockage of the first sensor. In one or more example methods, the method 700 can include controlling, at step 708, based on the blockage parameter, an operation of the autonomous vehicle.

The method 700 can be a method for measuring sensor range, and/or sensor visibility.

The blockage parameter can indicate a condition that reduces range and/or visibility. The blockage parameter can indicate an obscurance, a malfunction such as blockage, such as full blockage, partial blockage, reduced visibility. The blockage parameter can indicate no blockage.

Controlling an operation of the vehicle at step 706 can include determining a safe operation of the autonomous vehicle. Controlling an operation of the vehicle at step 706 can include maintenance of the autonomous vehicle.

In one or more example methods, determining the blockage parameter at step 706 can include determining, using the at least one processor, whether the first sensor data satisfies a criterion.

The criterion can be based on a threshold. The threshold can be indicative of a number of pass or failed sensors, such as data indicative of a pass or fail of a sensor.

In one or more example methods, determining the blockage parameter at step 706 can include, in response to determining that the first sensor data does not satisfy the criterion, determining, using the at least one processor, the blockage parameter as indicative of the first sensor being blocked.

In one or more example methods, determining the blockage parameter at step 706 can include, in response to determining that the first sensor data does satisfy the criterion, determining, using the at least one processor, the blockage parameter as indicative of the first sensor not being blocked.

For example, the blockage parameter can be indicative of the first sensor being blocked, such as partially blocked, such as with reduced range and/or visibility. In response to determining that the first sensor data satisfies the criterion, the method 700 can include determining the blockage parameter as indicative of no blockage of the first sensor.

In one or more example methods, the criterion can be based on an object indicated by the environment data. In one or more example methods, the first sensor data satisfies the criterion when the first sensor data indicates presence of the same object.

For example, the first sensor data can satisfy the criterion when the first sensor data indicates the presence of the object. For example, the object can be a stationary object, such as an infrastructure, such as a building. The distance from the vehicle to the position of the object can be used in the criterion. Different distance checks can be used.

In one or more example methods, the environment data can be obtained from three-dimensional map data.

For example, the environment data can be stored in the AV and/or stored in a memory. The environment data can be non-changing. The three-dimensional map data include HD map data.

In one or more example methods, the method 700 can include obtaining, using the at least one processor, location data indicative of a location of the autonomous vehicle.

For example, location data can be a location of the first sensor, such as location data obtained from a GPS.

In one or more example methods, the criterion can be based on the environment data and the location data. In one or more example methods, the comparison of the first sensor data and the environment data comprises a comparison of the first sensor data and a localized environment data. In one or more example methods, the localized environment data is obtained based on the environment data and the location data.

For example, the environment data can be indicative of a 'ground truth' of the operational domain. This can include high accurate 3D data of all stationary objects in the area of operation. The environment data and/or the location data can be used to localize the vehicle by matching stationary objects to the environment data in real time. Location data can also be used to localize the vehicle to a known location in the environment data, such as HD map. Weather can diminish the sensor range. The onboard system can compare the first sensor data (such as real time sensor object data) to the environment data (such as HD map data) combined with location data to check if the sensors are accurately detecting stationary objects.

In one or more example methods, the environment data can be obtained at step 704 from a second sensor.

In one or more example methods, the second sensor can be a same type of sensor as the first sensor.

For example, types can include one or more of LIDAR sensors, radar sensors, and camera sensors.

In one or more example methods, the first sensor can be a non-radar sensor and the second sensor is a radar sensor.

In one or more example methods, the method 700 can include determining, by the at least one processor, based on the first sensor data and the environment data, an overlapping field-of-vision parameter indicative of a maximum overlapping field-of-vision of the first sensor and the second sensor.

In one or more example methods, the criterion can be based on the environment data and the overlapping field-of-vision parameter.

For example, a location can be a point at a distance, multiple points, and/or multiple distances.

In one or more example methods, the first sensor can be selected from the group consisting of a radar sensor, a camera sensor, and a LIDAR sensor.

In one or more example methods, the operation can include one or more of a speed, an acceleration, and a direction of the autonomous vehicle.

For example, when the blockage parameter indicates a blockage of the first sensor, one or more of a speed, an acceleration, and a direction of the autonomous vehicle can be modified. When the blockage parameter indicates no blockage of the first sensor, one or more of a speed, an acceleration, and a direction of the autonomous vehicle are not modified.

In one or more example methods, controlling an operation of the autonomous vehicle at step 706 can be based on the blockage parameter and an external blockage parameter.

For example, the external blockage parameter can be obtained from an external device which is not associated with the autonomous vehicle, such as from another autonomous vehicle, such as from an autonomous vehicle fleet system, and/or such as from a V2I system.

In one or more example methods, the method 700 can further include controlling an operation of a vehicle in a fleet of autonomous vehicles.

For example, the method 700 can include transmitting a command, such as a signal, to a fleet system.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

"At least one," and "one or more" includes a function being performed by one element, a function being performed by more than one element, e.g., in a distributed fashion, several functions being performed by one element, several functions being performed by several elements, or any combination of the above.

Some embodiments of the present disclosure are described herein in connection with a threshold. As described herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Also disclosed are methods, non-transitory computer readable media, and systems according to any of the following items:

Item 1. A method, the method comprising:
obtaining, using at least one processor, first sensor data from a first sensor associated with an autonomous vehicle, wherein the first sensor data is indicative of an environment in which the autonomous vehicle is operating;
obtaining, using the at least one processor, environment data indicative of the environment;
determining, using the at least one processor, based on a comparison of the first sensor data and the environment data, a blockage parameter indicative of a blockage of the first sensor; and
controlling, based on the blockage parameter, an operation of the autonomous vehicle.

Item 2. The method of Item 1, wherein determining the blockage parameter comprises determining, using the at least one processor, whether the first sensor data satisfies a criterion.

Item 3. The method of Item 2, wherein determining the blockage parameter comprises, in response to determining that the first sensor data does not satisfy the criterion, determining, using the at least one processor, the blockage parameter as indicative of the first sensor being blocked.

Item 4. The method of any one of Items 2-3, wherein the criterion is based on an object indicated by the environment data, wherein the first sensor data satisfies the criterion when the first sensor data indicates presence of the same object.

Item 5. The method of any one of the preceding Items, wherein the environment data is obtained from three-dimensional map data.

Item 6. The method of any one of the preceding Items, the method comprising obtaining, using the at least one processor, location data indicative of a location of the autonomous vehicle.

Item 7. The method of Item 6, wherein the comparison of the first sensor data and the environment data comprises a comparison of the first sensor data and a localized environment data, wherein the localized environment data is obtained based on the environment data and the location data.

Item 8. The method of any one of Items 1-4, wherein the environment data is obtained from a second sensor.

Item 9. The method of Item 8, wherein the second sensor is a same type of sensor as the first sensor.

Item 10. The method of Item 8, wherein the first sensor is a non-radar sensor and the second sensor is a radar sensor.

Item 11. The method of any one of Items 8-10, the method comprising:
determining, by the at least one processor, based on the first sensor data and the environment data, an overlapping field-of-vision parameter indicative of a maximum overlapping field-of-vision of the first sensor and the second sensor.

Item 12. The method of Item 11, wherein the criterion is based on the environment data and the overlapping field-of-vision parameter.

Item 13. The method of any one of the preceding Items, wherein the first sensor is selected from the group consisting of a radar sensor, a camera sensor, and a LIDAR sensor.

Item 14. The method of any one of the preceding Items, wherein the operation comprises one or more of a speed, an acceleration, and a direction of the autonomous vehicle.

Item 15. The method of any one of the preceding Items, wherein controlling an operation of the autonomous vehicle is based on the blockage parameter and an external blockage parameter.

Item 16. The method of any one of the preceding Items, further comprising, controlling an operation of a vehicle in a fleet of autonomous vehicles.

Item 17. A non-transitory computer readable medium comprising instructions stored thereon that, when executed by at least one processor, cause the at least one processor to carry out operations comprising:

obtaining, using at least one processor, first sensor data from a first sensor associated with an autonomous vehicle, wherein the first sensor data is indicative of an environment in which the autonomous vehicle is operating;

obtaining, using the at least one processor, environment data indicative of the environment;

determining, using the at least one processor, based on a comparison of the first sensor data and the environment data, a blockage parameter indicative of a blockage of the first sensor; and controlling, based on the blockage parameter, an operation of the autonomous vehicle.

Item 18. The non-transitory computer readable media of Item 17, wherein determining the blockage parameter comprises determining, using the at least one processor, whether the first sensor data satisfies a criterion.

Item 19. The non-transitory computer readable media of Item 18, wherein determining the blockage parameter comprises, in response to determining that the first sensor data does not satisfy the criterion, determining, using the at least one processor, the blockage parameter as indicative of the first sensor being blocked.

Item 20. The non-transitory computer readable media of any one of Items 18-19, wherein the criterion is based on an object indicated by the environment data, wherein the first sensor data satisfies the criterion when the first sensor data indicates presence of the same object.

Item 21. The non-transitory computer readable media of any one of Items 17-20, wherein the environment data is obtained from three-dimensional map data.

Item 22. The non-transitory computer readable media of any one of Items 17-21, the method comprising obtaining, using the at least one processor, location data indicative of a location of the autonomous vehicle.

Item 23. The non-transitory computer readable media of Item 22, wherein the comparison of the first sensor data and the environment data comprises a comparison of the first sensor data and a localized environment data, wherein the localized environment data is obtained based on the environment data and the location data.

Item 24. The non-transitory computer readable media of any one of Items 17-20, wherein the environment data is obtained from a second sensor.

Item 25. The non-transitory computer readable media of Item 24, wherein the second sensor is a same type of sensor as the first sensor.

Item 26. The non-transitory computer readable media of Item 24, wherein the first sensor is a non-radar sensor and the second sensor is a radar sensor.

Item 27. The non-transitory computer readable media of any one of Items 24-26, the method comprising:

determining, by the at least one processor, based on the first sensor data and the environment data, an overlapping field-of-vision parameter indicative of a maximum overlapping field-of-vision of the first sensor and the second sensor.

Item 28. The non-transitory computer readable media of Item 27, wherein the criterion is based on the environment data and the overlapping field-of-vision parameter.

Item 29. The non-transitory computer readable media of any one of Items 17-28, wherein the first sensor is selected from the group consisting of a radar sensor, a camera sensor, and a LIDAR sensor.

Item 30. The non-transitory computer readable media of any one of Items 17-29, wherein the operation comprises one or more of a speed, an acceleration, and a direction of the autonomous vehicle.

Item 31. The non-transitory computer readable media of any one of Items 17-30, wherein controlling an operation of the autonomous vehicle is based on the blockage parameter and an external blockage parameter.

Item 32. The non-transitory computer readable media of any one of Items 17-31, further comprising, controlling an operation of a vehicle in a fleet of autonomous vehicles.

Item 33. A system, comprising at least one processor; and at least one memory storing instructions thereon that, when executed by the at least one processor, cause the at least one processor to:

obtain first sensor data from a first sensor associated with an autonomous vehicle, wherein the first sensor data is indicative of an environment in which the autonomous vehicle is operating;

obtain environment data indicative of the environment;

determine, based on a comparison of the first sensor data and the environment data, a blockage parameter indicative of a blockage of the first sensor; and control, based on the blockage parameter, an operation of the autonomous vehicle.

Item 34. The system of Item 33, wherein to determine the blockage parameter comprises to determine whether the first sensor data satisfies a criterion.

Item 35. The system of Item 34, wherein to determine the blockage parameter comprises, in response to determining that the first sensor data does not satisfy the criterion, to determine the blockage parameter as indicative of the first sensor being blocked.

Item 36. The system of any one of Items 34-35, wherein the criterion is based on an object indicated by the environment data, wherein the first sensor data satisfies the criterion when the first sensor data indicates presence of the same object.

Item 37. The system of any one of Items 33-36, wherein the environment data is obtained from three-dimensional map data.

Item 38. The system of any one of Items 33-37, wherein the at least one memory storing instructions thereon that, when executed by the at least one processor, cause the at least one processor to obtain, using the at least one processor, location data indicative of a location of the autonomous vehicle.

Item 39. The system of Item 38, wherein the comparison of the first sensor data and the environment data comprises a comparison of the first sensor data and a localized environment data, wherein the localized environment data is obtained based on the environment data and the location data.

Item 40. The system of any one of Items 33-36, wherein the environment data is obtained from a second sensor.

Item 41. The system of Item 40, wherein the second sensor is a same type of sensor as the first sensor.

Item 42. The system of Item 40, wherein the first sensor is a non-radar sensor and the second sensor is a radar sensor.

Item 43. The system of any one of Items 40-42, wherein the at least one memory storing instructions thereon that, when executed by the at least one processor, cause the at least one processor to:

determine, based on the first sensor data and the environment data, an overlapping field-of-vision parameter indicative of a maximum overlapping field-of-vision of the first sensor and the second sensor.

Item 44. The system of Item 43, wherein the criterion is based on the environment data and the overlapping field-of-vision parameter.

Item 45. The system of any one of Items 33-44, wherein the first sensor is selected from the group consisting of a radar sensor, a camera sensor, and a LIDAR sensor.

Item 46. The method of any one of Items 33-45, wherein the operation comprises one or more of a speed, an acceleration, and a direction of the autonomous vehicle.

Item 47. The system of any one of Items 33-46, wherein to control an operation of the autonomous vehicle is based on the blockage parameter and an external blockage parameter.

Item 48. The system of any one of Items 33-47, wherein the at least one memory storing instructions thereon that, when executed by the at least one processor, cause the at least one processor to control an operation of a vehicle in a fleet of autonomous vehicles.

What is claimed is:

1. A method, comprising:

obtaining, using at least one processor, first sensor data from a first sensor associated with a first autonomous vehicle, wherein the first sensor data is indicative of an environment in which the first autonomous vehicle is operating;

obtaining, using the at least one processor, environment data indicative of the environment;

determining, using the at least one processor, based on a comparison of the first sensor data and the environment data, a first blockage parameter indicative of a first blockage of the first sensor;

obtaining, using the at least one processor, a second blockage parameter from a second autonomous vehicle operating in the environment, wherein the second blockage parameter indicates a second blockage of a second sensor associated with the second autonomous vehicle, wherein the second autonomous vehicle determines the second blockage parameter;

determining, using the at least one processor, an adverse weather condition in the environment based on the first blockage parameter and the second blockage parameter;

controlling, based on the determined adverse weather condition, an operation of the first autonomous vehicle; and communicating the determined adverse weather condition to a fleet management system, wherein the fleet management system is configured to updates driving parameters for a fleet of autonomous vehicles in the environment based on the determined adverse weather condition.

2. The method of claim 1, wherein determining the first blockage parameter comprises determining, using the at least one processor, whether the first sensor data satisfies a criterion.

3. The method of claim 2, wherein determining the first blockage parameter comprises, in response to determining that the first sensor data does not satisfy the criterion, determining, using the at least one processor, the first blockage parameter as indicative of the first sensor being blocked.

4. The method of claim 3, wherein the criterion is based on an object indicated by the environment data, wherein the first sensor data satisfies the criterion when the first sensor data indicates a presence of the object.

5. The method of claim 1, wherein the environment data is based on three-dimensional map data and data obtained from a third sensor associated with the first autonomous vehicle.

6. The method of claim 5, wherein the third sensor is a same type of sensor as the first sensor.

7. The method of claim 5, wherein the first sensor is a non-radar sensor and the third sensor is a radar sensor.

8. The method of claim 5, further comprising:

determining, by the at least one processor, based on the first sensor data and the environment data, an overlapping field-of-vision parameter indicative of a maximum overlapping field-of-vision of the first sensor and the third sensor.

9. The method of claim 8, wherein determining the first blockage parameter comprises determining, using the at least one processor, whether the first sensor data satisfies a criterion, wherein the criterion is based on the environment data and the overlapping field-of-vision parameter.

10. The method of claim 1, the method comprising obtaining, using the at least one processor, location data indicative of a location of the first autonomous vehicle.

11. The method of claim 10, wherein the comparison of the first sensor data and the environment data comprises a comparison of the first sensor data and a localized environment data, wherein the localized environment data is obtained based on the environment data and the location data.

12. The method of claim 1, wherein the first sensor is selected from a group consisting of a radar sensor, a camera sensor, and a LIDAR sensor.

13. The method of claim 1, wherein the operation comprises one or more of a speed, an acceleration, and a direction of the first autonomous vehicle.

14. The method of claim 1, wherein the fleet of autonomous vehicles comprises a plurality of autonomous vehicles, wherein to update the driving parameters the fleet management system is configured to update an operating route to avoid the environment.

15. The method of claim 1, further comprising decelerating the first autonomous vehicle.

16. A non-transitory computer readable medium comprising instructions stored thereon that, when executed by at least one processor, cause the at least one processor to carry out operations comprising:

obtaining first sensor data from a first sensor associated with a first autonomous vehicle, wherein the first sensor data is indicative of an environment in which the first autonomous vehicle is operating;

obtaining environment data indicative of the environment;

determining based on a comparison of the first sensor data and the environment data, a first blockage parameter indicative of a first blockage of the first sensor;

obtaining, using the at least one processor, a second blockage parameter from a second autonomous vehicle operating in the environment, wherein the second blockage parameter indicates a second blockage of a second sensor associated with the second autonomous vehicle, wherein the second autonomous vehicle determines the second blockage parameter;

determining an adverse weather condition in the environment based on the first blockage parameter and the second blockage parameter;

controlling, based on the determined adverse weather condition, an operation of the first autonomous vehicle; and communicating the determined adverse weather condition to a fleet management system, wherein the fleet management system is configured to update driving parameters for a fleet of autonomous vehicles in the environment based on the determined adverse weather condition.

17. A system, comprising at least one processor; and at least one memory storing instructions thereon that, when executed by the at least one processor, cause the at least one processor to:

obtain first sensor data from a first sensor associated with a first autonomous vehicle, wherein the first sensor data is indicative of an environment in which the first autonomous vehicle is operating;

obtain environment data indicative of the environment;

determine, based on a comparison of the first sensor data and the environment data, a first blockage parameter indicative of a first blockage of the first sensor;

obtain a second blockage parameter from a second autonomous vehicle operating in the environment, wherein the second blockage parameter indicates a second blockage of a second sensor associated with the second autonomous vehicle, wherein the second autonomous vehicle determines the second blockage parameter;

determine an adverse weather condition in the environment based on the first blockage parameter and the second blockage parameter;

control, based on the determined adverse weather condition, an operation of the first autonomous vehicle; and communicate the determined adverse weather condition to a fleet management system, wherein the fleet management system is configured to update driving parameters for a fleet of autonomous vehicles in the environment based on the determined adverse weather condition.

18. The system of claim 17, wherein the environment data includes three-dimensional map data and data obtained from a third sensor associated with the first autonomous vehicle.

* * * * *